United States Patent [19]

Christen et al.

[11] 4,056,467
[45] Nov. 1, 1977

[54] HOLLOW FIBRES

[75] Inventors: Gilbert Christen, Lyon; Bernard Favre, Ecully; Xavier Marze, Lyon; Michel Salmon, Mions; Rene Thuillier, Morance, all of France

[73] Assignee: Rhone-Poulenc S.A., Paris, France

[21] Appl. No.: 583,168

[22] Filed: June 3, 1975

Related U.S. Application Data

[62] Division of Ser. No. 395,155, Sept. 7, 1973, Pat. No. 3,930,105.

[30] Foreign Application Priority Data

Sept. 12, 1972 France .............................. 72.32285

[51] Int. Cl.² ............................................ B01D 13/00
[52] U.S. Cl. ............................ 210/23 F; 210/321 R; 210/500 M
[58] Field of Search ............ 210/500 M, 321 R, 23 H, 210/23 U; 264/182, 209

[56] References Cited

U.S. PATENT DOCUMENTS

| | | | |
|---|---|---|---|
| 3,228,877 | 1/1966 | Mahon ........................ | 210/500 M X |
| 3,342,729 | 9/1967 | Strand ........................ | 210/500 M X |
| 3,423,491 | 1/1969 | McLain et al. ............. | 210/500 M X |
| 3,526,588 | 9/1970 | Michaels et al. ........... | 210/500 M X |
| 3,616,930 | 11/1971 | Muir ............................ | 210/500 M X |
| 3,674,628 | 7/1972 | Fabre .......................... | 210/321 R X |
| 3,750,735 | 8/1973 | Chiang et al. ............... | 210/23 H X |
| 3,773,848 | 11/1973 | Perry et al. .................. | 210/23 H X |
| 3,799,356 | 3/1974 | Salyer et al. ................ | 210/500 M |
| 3,819,742 | 6/1974 | Brun et al. .................. | 210/23 UX |

OTHER PUBLICATIONS

Osborn et al., Def. Pub., published Mar. 9, 1971, 884 O. G. 433.

Primary Examiner—Frank A. Spear, Jr.
Attorney, Agent, or Firm—Stevens, Davis, Miller & Mosher

[57] ABSTRACT

A hollow fiber is provided possessing a continuous longitudinally extending channel free from macromolecular material, said fiber consisting essentially of a copolymer of acrylonitrile and an olefinically unsaturated comonomer containing an optionally salified sulphonic acid group, and possessing micropores of average diameter less than about 100 A, between 40% and 80% of walls of the fiber being empty space. This fiber can be prepared by injecting a solution of a copolymer of acrylonitrile and an olefinically unsaturated comonomer containing an optionally salified sulphonic acid group in at least one polar organic solvent into a spinneret with an annular orifice, and immediately coagulating the inside and the outside of the nascent hollow fiber issuing from the spinneret with a coagulating fluid which is selected from:

a. a less than saturated aqueous solution of an inorganic salt, said solution optionally containing up to 40% of a miscible polar organic solvent, and
b. at least one polar organic solvent which is a non-solvent for the acrylonitrile copolymer and is miscible with the solvent for the copolymer, the coagulation inside the fiber being carried out by injecting coagulating fluid inside the nascent fiber. Such fibers possess excellent permeability to water which makes them particularly useful in ultrafiltration as well as dialysis, especially haemodialysis.

8 Claims, 1 Drawing Figure

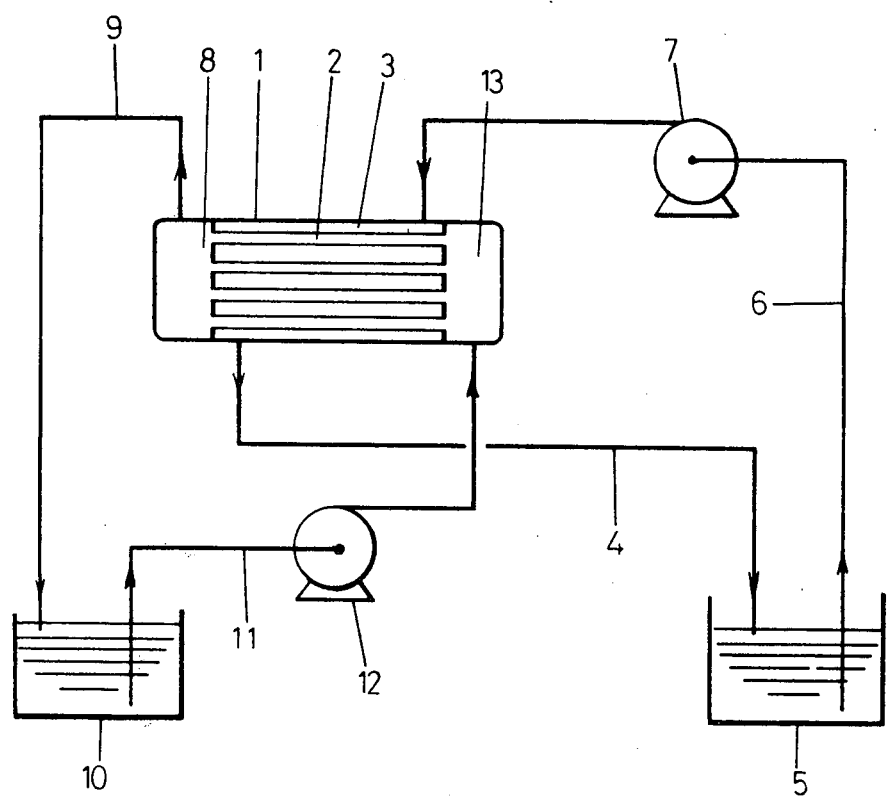

HOLLOW FIBRES

This is a division of application Ser. No. 395,155, filed Sept. 7, 1973, now U.S. Pat. No. 3,930,105.

The present invention relates to hollow fibres.

The term "hollow fibres" as used herein, is intended to mean fibres which possess a continuous channel located longitudinally inside the fibre. Recently, hollow fibres have been investigated quite thoroughly. A review of the subject appears, for example, in *Encyclopedia of Polymer Science and Technology*, 15, 258 – 272 (1971).

Hollow fibres made of cellulosic esters such as cellulose acetate have been developed in particular; nevertheless, such fibres possess disadvantages. Amongst these disadvantages, there may be mentioned the risk of changes in the properties of the fibres as a result of slow and/or partial hydrolysis of the ester groups in the cellulose, this hydrolysis taking place either simply under atmospheric conditions over a period of time, or, for example, under the effect of cleaning agents. This is why attempts have been made to produce hollow fibres based on other materials; for this purpose acrylonitrile polymers have proved particularly valuable.

In parallel with this development regarding the chemical nature of the hollow fibres, investigations have been directed to making the structure of the fibres more suitable. In particular, hollow fibres have been sought which have improved permeability towards fluids which pass through them. Thus, in U.S. Pat. No. 3,423,491, it has been proposed to melt-spin a mixture of a thermoplastic polymer and a plasticiser, and then to remove the plasticiser by lixiviation. The thermoplastic polymer can be a polymer of acrylonitrile and a non-ionic comonomer such as vinyl acetate. The plasticiser content in the mixture is of course limited by the fact that it must still be possible to melt-spin this mixture. In fact, hollow fibres prepared in this way are mainly effective for use in reverse osmosis because they possess a degree of salt rejection which is, in practice, greater than 75%.

For certain applications such as ultrafiltration and dialysis, especially haemodialysis, hollow fibres which have such a degree of rejection of salt are undesirable and may even be forbidden.

It has also been proposed to produce hollow fibres with a skin made of acrylonitrile polymers, the wall of these fibres consisting essentially of a skin and a porous substrate. These fibres are described in U.S. Pat. No. 3,674,628. They have also been described in the research and development report of the U.S.A. Government No. PB.192,846. The process for their preparation consists of a. injecting a polymer solution into a spinneret with a ring-shaped or annular orifice, b. solidifying a peripheral zone of the filament issuing from the spinneret, and then simultaneously or subsequently, c. coagulating the internal and/or external peripheral zone of the fibre. In practice, the solidification is carried out by passing the fibre as it it formed through air at the outlet of the spinneret which is a so-called "emergent" spinneret; the coagulation is effected by the action of a coagulating agent, that is to say a non-solvent for the polymer of which the fibre is made.

A similar process has also been proposed for cellulosic fibres (see Encycl. Polym. Sc. Tech., 15, 263 (1971)), but it produces fibres for reverse osmosis which have high degrees of rejection of salts. It is in effect known, as U.S. Pat. No. 3,423,491 confirms, that the way in which the fibres are prepared generally has a great influence on the properties and/or performance of the fibres.

Although such fibres possessing a skin provide considerable advantages, they nevertheless possess disadvantages in certain cases; thus, when it is desired to improve the turbulence of the fluids passing through apparatuses possessing hollow fibres by giving these fibres particular shapes such as waves, curls and braidings, the skin of such fibres presents a point of weakness which can give rise to stray fluid flows. The fragility of the fibres also presents problems in other situations, for example when it is desired to handle them in automatic apparatuses with high flow rates and with great accelerations or decelerations and when they are used with a differential pressure between the walls of the fibres. In the latter case, which applies in ultrafiltration, it is also found that the hollow fibres are the more fragile, the higher is the content of ionic comonomer in the acrylonitrile polymer; difficulties can arise when, for example, greater than 5% (by number) of the recurring units are derived from the ionic comonomer.

An aim of the present invention is to provide hollow fibres made of acrylonitrile polymer which do not have the disadvantages of the prior art, and, especially, to provide fibres which do not possess a skin but which possess high permeability.

According to the present invention, there are provided hollow fibres characterised in that:

1. they consist of a copolymer of acrylonitrile and an olefinically unsaturated monomer carrying optionally salified sulphonic acid groups (this monomer being denoted hereafter as the "sulphonic acid comonomer"), 2. they are microporous and possess micropores of average diameter less than 100 A, and 3. between 40% and 80% of the walls is empty space.

The proportion of "empty space" in the wall of a microporous hollow fibre, is defined by $100 (1 - (V_2/V_1))$, $V_1$ being the volume occupied by the wall of a sample $E_1$ of microporous hollow fibre of weight p, and $V_2$ being the volume occupied by the wall of a sample $E_2$ of hollow fibre with a compact structure having a weight p and made of the same polymeric material as the microporous hollow fibre.

By "hollow fibre with a compact structure", there is meant a hollow fibre which is watertight under an internal relative pressure of 3 bars.

In practice, the volumes $V_1$ and $V_2$ can be calculated from measurements of the length and the internal and external diameters of the samples $E_1$ and $E_2$, these measurements being themselves made by simple optical observations (with a microscope in the case of the diameters). The sample $E_2$ of hollow fibre with a compact structure of volume $V_2$ can be obtained by drying, for example at 60° C and under an absolute pressure of 10 mm of mercury, the sample $E_1$ of microporous hollow fibre of volume $V_1$; although the dimensions of the sample of hollow fibre vary during drying due to shrinkage, nevertheless the weight p of dry material is retained and the volume $V_2$ of the sample $E_2$ is the same (precisely because of its compact structure) as the volume of an imaginary sample $E_3$ having the same length and the same internal diameter as $E_1$ and differing from $E_1$ only by its external diameter; it follows that the proportion of empty space $100 (1 - (V_2/V_1))$ corresponds to the volume shrinkage due to the change from the microporous structure to the compact structure.

Products of the formula: $CHR_1 = CR_3 - A - Y$ (I) in which Y represents a $-SO_3H$ or $-SO_3M$ group, M being a metal atom, preferably an alkali metal atom, $R_1$ and $R_3$ independently represent a hydrogen atom or a methyl group, A represents a valency bond or a group $- A' -$ or $- O - A' -$, in which A' represents a straight or branched, saturated or unsaturated, divalent aliphatic hydrocarbon group, an unsubstituted aromatic nucleus, or a monoaromatic-monoaliphatic chain in which one of the free valencies is carried by an aliphatic carbon atom and the other by a carbon atom of the aromatic nucleus, are generally used as the sulphonic acid comonomer of acrylonitrile.

Specific sulphonic acid comonomers which may be used include vinylsulphonic, allylsulphonic, methallylsulphonic, styrenesulphonic, vinyloxybenzenesulphonic, allyloxy- and methallyloxybenzenesulphonic, and allyloxy- and methallyloxyethylsulphonic acids, as well as the salts of these various acids, preferably their alkali metal salts.

The proportion of sulphonic acid comonomer in the acrylonitrile copolymer is generally between 1 and 50% (by number) of sulphonic acid monomer units, and preferably between 5 and 15%. The acrylonitrile copolymers have a specific viscosity (measured at 25° C as a 2g/l solution in dimethylformamide) which is usually between 0.1 and 3, and preferably between 0.5 and 1.5.

The diameter of the micropores in the fibres of the present invention can be determined with the aid of an electron microscope, for example using a magnification of 20,000 by observing the surfaces and/or the cross-sections of the fibres.

The external diameter of the hollow fibres of this invention is usually between 50 and 1,000 $\mu$, and preferably between 100 and 600 $\mu$; the thickness of the walls is generally between 5 and 40%, and preferably between 10 and 25%, of the external diameter.

The hollow fibres according to the invention are generally free from vacuoles i.e. empty spaces present in the walls of the fibres, the greatest dimension of such spaces being greater than approximately 5 $\mu$, and do not possess a skin or a dense layer at the surface. Their degree of salt rejection is generally zero, measured under a pressure of 2 bars for an aqueous solution containing 10 g/l NaCl.

The present invention also relates to a process for the preparation of hollow fibres, especially of hollow fibres as defined above. This process is characterised in that a "collodion", formed from a solution of the copolymer of acrylonitrile and the sulphonic acid comonomer in a polar organic solvent (or mixture of solvents) is injected into a spinneret with an annular orifice, and that, immediately at the outlet of the spinneret, the inside and the outside of the nascent hollow fibre are coagulated by means of a coagulating fluid which is either:

a. an aqueous solution of an inorganic salt of concentrations less than that required for saturation, usually between 1 and 35% by weight, and preferably between 5 and 20%, or b. a polar organic solvent or a mixture of polar organic solvents, this solvent (or solvents) being a non-solvent for the acrylonitrile copolymer and being miscible with the solvent for the collodion.

By "collodion" is meant a solution of the copolymer of acrylonitrile and the sulphonic acid comonomer such that it can be spun.

Known solvents for the copolymers of acrylonitrile and the sulphonic acid monomer are generally used as the polar organic solvent which is capable of forming the collodion, in particular dimethylsulphoxide, dimethylacetamide, hexamethylphosphotriamide and, especially, dimethylformamide (DMF).

Instead of a single solvent, the collodion can be produced from a mixture of solvents; it is also possible to add a minor amount of a non-solvent for the polymer to this solvent or mixture of solvents, insofar as the whole remains a solvent for the acrylonitrile polymer.

The concentration of acrylonitrile copolymer in the collodion is generally greater than 5% by weight and less than that required for saturation; it is preferably greater than 20% by weight.

The collodion is then coagulated by simply bringing the collodion into contact with the coagulating fluid, immediately at the outlet of the spinneret.

Such a coagulation has been disclosed in U.S. Pat. No. 3,674,628 but in the process described there is a sufficient temperature difference between the collodion and the coagulating fluid for the fibre to set immediately it leaves the spinneret. In the process of this invention, on the other hand, there is no such setting step and the difference in temperature between the collodion and the coagulating fluid is generally less than 30° C.

The external coagulation of the nascent hollow fibre is effected in practice by making the fibre, during its formation, to flow through a bath of coagulating fluid (of "coagulating bath").

The internal coagulation of the nascent hollow fibre is effected in practice by injecting coagulating fluid into the core, that is to say into the inside of the fibre during its formation.

The temperature of the coagulating fluids and of the collodion can vary within wide limits; they are generally between $-10$ and $+40°$ C, and preferably between 0 and 30° C. Low temperatures generally favour the absence of vacuoles. The temperatures of the collodion, of the internal coagulating fluid and of the spinneret are usually the same for economic and technical reasons; in contrast, the temperature of the coagulating bath can be different from the other three.

When the coagulating fluid is an aqueous solution of an inorganic salt, a salt of an alkali metal or alkaline earth metal which is soluble in water is advantageously used; it is generally preferred to use sodium chloride. It is however also possible to use lithium, sodium, potassium, magnesium and calcium chlorides, sulphates, nitrates and perchlorates, within the limits of their solubility.

The non-solvent power of these aqueous solutions can be altered by adding miscible polar organic solvents, for example dimethylformamide, in a proportion which is preferably less than 40% (by volume).

When the coagulating fluid is a polar organic solvent or a mixture of polar organic solvents, alcohols such as methanol, ethanol, propanols and butanols, aliphatic diols, especially ethylene glycol, or aliphatic ketones such as acetone and methyl ethyl ketone, are advantageously used as the non-solvent for the acrylonitrile copolymer; the non-solvent power of this solvent or mixture of solvents can be changed by adding minor amounts (generally less than 25%) of solvents for the acrylonitrile copolymer such as those mentioned above e.g. dimethylformamide, dimethylsulphoxide, dimethylacetamide and hexamethylphosphotriamide.

During the coagulation, a part of the solvent for the collodion migrates into the coagulating fluid and this, consequently, can change the composition thereof somewhat.

For the purpose of ensuring that the hollow fibres have a uniform and symmetrical shape, it is preferred to position the spinneret along a vertical axis with the collodion flowing in a downwards direction; in practice, the spinnerets are immersed spinnerets.

The nascent fibre is kept in contact with the coagulating fluids at least until the fibre is sufficiently hardened to enable it to be handled and no longer flows under the working conditions.

The coagulation described above can be followed by washing with pure water in order to remove nonpolymeric constituents from the fibre (especially solvents and/or salts).

The fibres, prepared by the coagulation process described above, can be given an aqueous heat treatment for the purposes of improving their performance, especially their permeability.

The hollow fibres subjected to this treatment can have undergone a partial washing with pure water or with a mixture of water and an organic solvent but, regardless of this, at the time of the aqueous heat treatment, the fibres still advantageously contain a little of the solvent or solvents which initially formed the collodion; more precisely, the proportion of residual solvent in the hollow fibres during the aqueous heat treatment is generally between 5 and 20%, and preferably between 10 and 17%.

This aqueous heat treatment generally consists of immersing the hollow fibres in water or in a mixture of water and a non-solvent at a temperature between 60° and 250° C, and preferably between 80° and 190° C.

The water or the aqueous mixtures used can be in the vapour phase; however, it is preferable to use them in the liquid phase. Of course, a treatment above 100° C can make it necessary to work under pressure when it is desired to use liquid water in order to carry out the aqueous heat treatment.

The proportion of water in the aqueous mixtures which can be used in this treatment is usually greater than 50% by weight, and preferably greater than 90%. The water can be mixed with organic solvents or with inorganic or organic electrolytes but it is then preferred to use mixtures which are chemically neutral and especially not strongly basic so as to avoid chemical attack of the acrylonitrile copolymer. A pH of 6 to 8 is generally suitable.

According to an advantageous procedure, the aqueous heat treatment is carried out continuously by making the fibre flow continuously through the hot water treatment bath, the pressure being atmospheric and the temperature being at most equal to 100° C. The duration of the treatment is usually 5 seconds to 5 minutes but there is no critical upper limit.

The aqueous heat treatment described above is preferably accompanied by stretching the fibres longitudinally; this stretching is usually 50 to 500% and preferably 100 to 250%.

Finally, it is possible to impart better dimensional stability to the stretched fibres by carrying out a relaxation by subsequently leaving these fibres, without a stretching force, in an aqueous bath at a temperature which is preferably below that of the heat treatment.

The fibres according to the invention can be stored in the moist state, particularly using glycerine, for example immersed in a mixture of water and glycerine containing at least 40% by weight of glycerine.

The fibres according to the invention possess excellent permeability to water, which makes them especially advantageous in ultrafiltration as well as in dialysis, especially haemodialysis. They do not clog readily and they are very suitable for separating macromolecular solutions; they can thus be used in a variety of ultrafiltration applications. They also have a good resistance to pressure.

Amongst the applications of the hollow fibres according to the invention, the production of enzymatic reactors should be mentioned in particular. Such a reactor can be equipped as shown diagrammatically in the FIGURE of the accompanying drawings.

A reactor 1 comprises a plurality of hollow fibres shown generally at 2 and a system of compartments which make it possible to achieve two liquid flows, one inside the hollow fibres and the other outside. The liquid flowing outside the hollow fibres passes successively through a compartment 3, pipeline 4, expansion vessel 5, pipeline 6 and pump 7; the liquid flowing inside the hollow fibres passes successively through compartment 8, pipeline 9, expansion vessel 10, pipeline 11, pump 12, compartment 13 and fibres 2.

In using such a reactor, the enzyme, in solution or suspension, is made to flow on one side of the walls of the hollow fibres and a substrate (in solution or suspension) is made to flow on the other side of these same walls. For the purposes of convenience and simplicity, the enzyme will be described as flowing outside the hollow fibres and the substrate inside, it being understood that the reverse is perfectly possible. Thus, in the apparatus of the FIGURE, the enzyme passes through the circuit 3, 4, 5, 6 and 7, and the substrate passes through the circuit 8, 9, 10, 11, 12, 13 and the channel inside the fibres.

The enzyme/substrate pairs which are capable of being reacted in the enzymatic reactors are such that the hollow fibres are practically impermeable to the enzyme and permeable to the substrate and to the products of the enzymatic reaction; in this way, it is easy to separate the enzyme from its reaction mixture (substrate + reaction products) and losses of enzymes are minimal.

The hollow fibres according to the invention make it possible in particular to treat urea with urease, and hence they are used in artificial kidneys.

The following Examples further illustrate the present invention. All the hollow fibres of these Examples have zero salt rejection.

EXAMPLE 1

A "collodion" is prepared by dissolving 23.5 g of a copolymer of acrylonitrile and sodium methallylsulphonate (9% by weight of methallylsulphonate, corresponding to 3.2% by number of sulphonic acid monomer units; specific viscosity measured at 25° C as a 2g/l solution in DMF = 0.90) in 76.5 g of dimethylformamide (DMF).

The collodion is injected at the rate of 4.5 cm$^3$/minute into the annular (ring-shaped) orifice of a spinneret (internal diameter of the ring: 0.6 mm; external diameter of the ring: 0.8 mm).

The spinneret is arranged along a vertical axis and its lower orifice end is immersed in an aqueous solution of sodium chloride of concentration 200 g/l at 2° C. At the centre of the annular orifice of the spinneret, there is a second orifice of diameter 0.3 mm, through which an aqueous solution of sodium chloride of concentration 200 g/l, at 23° C, is injected, at the rate of 1.7 cm³/minute, into the core of the nascent hollow fibre.

The nascent hollow fibre travels vertically downwards through the coagulating bath over a length of 1 m at the rate of 9 m/minute; at the outlet of this coagulating bath, the hollow fibre passes horizontally for 30 cm through a bath of boiling water and it is guided at the inlet and at the outlet of this bath by wheels, the speed at which the fibre enters this bath being 9 m/minute and the speed at which it issues being 27 m/minute. At the outlet, the fibre is wound up on a roller; the treatment of the fibre is completed by washing with pure water by sprinkling it for 1 minute over turns wound up on the roller (the fibres were thus stretched in a ratio of 3).

The fibre thus produced has an internal diameter of 350 μ, an external diameter of 520 μ and a proportion of empty space (in the walls) of 61%; a study of cross-sections of this fibre under an electron microscope (magnification: 20,000) shows that it does not have any pores of diameter greater than or equal to 100 A.

From the fibre thus prepared, an ultrafiltration apparatus (or module) is produced which possesses 180 fibres of length 80 cm, each with a useful length of 64 cm, arranged in parallel (64 cm represent the length available for ultrafiltration). The apparatus thus has an average surface area for exchange of 0.13 m².

An aqueous solution, of concentration 1 g/l, of bovine albumin or molecular weight 70,000, is made to flow outside these fibres, under a relative pressure of 2 bars.

An ultrafiltrate is obtained with a flow rate of 121 l/day. m² and a degree of rejection of 100% [the degree of rejection is defined by expression:

$$100 \times \left(1 - \frac{\text{concentration of solute in the ultrafiltrate}}{\text{concentration of solute in the liquid to be ultrafiltered}}\right)]$$

Other characteristics of these fibres are given in Table I, together with characteristics of the fibres of Examples 2 to 7.

of empty space is 54%. There are no pores of diameter greater than or equal to 100 A.

EXAMPLE 3

Example 1 is repeated, changing the stretching ratio in boiling water; the fibre is stretched to 5 times its original length.

The hollow fibre obtained has an internal diameter of 255 μ and an external diameter of 385 μ. The proportion of empty space is 56%. There are no pores of diameter greater than or equal to 100 A.

EXAMPLE 4

Example 1 is repeated, dispensing with the treatment using boiling water.

EXAMPLE 5

Example 1 is repeated with the following changes: The coagulating fluid inside the nascent hollow fibre is an aqueous solution of NaCl of concentration 50 g/l (23° C), and the external coagulating bath is a mixture of water and dimethylformamide in proportions by volume of 3/1, containing 50 g of NaCl per liter (25° C).

The fibres obtained have a proportion of empty space of 68%, an external diameter of 415 μ and an internal diameter of 261 μ. There are no pores of diameter greater than or equal to 100 A.

EXAMPLE 6

Example 5 is repeated, using an external coagulating bath at 0° C. The fibres have a proportion of empty space of 57%, an external diameter of 450 μ and an internal diameter of 280 μ. There are no pores of diameter greater than or equal to 100 A.

EXAMPLE 7

Example 6 is repeated, replacing the water of the external coagulating bath with methanol and dispensing with the salt (NaCl). The fibres have a proportion of empty space of 69%, an external diameter of 435 μ and an internal diameter of 275 μ. There are no pores of diameter greater than or equal to 100 A.

Some characteristics of the fibres prepared in the preceding Examples are given in Table I.

TABLE I

| Example | Ultrafiltration of pure water under a relative pressure of 2 bars inside the fibres. Flow rate in l/day. m² at 23° C. | Ultrafiltration of a solution containing 1 g/l of a macromolecular solute at 23° C under a relative pressure of 2 bars outside the fibres. | | |
|---|---|---|---|---|
| | | Nature of the solute | Molecular weight of the solute | Flow rate of the ultrafiltrate in l/day. m² | Degree of rejection in % |
| 1 | 324 | bovine albumin | 70,000 | 121 | 100 |
| 1 | | dextran | 40,000 | 111 | 90 |
| 1 | | lysozyme | 15,000 | 85 | 100 |
| 2 | 283 | | | | |
| 3 | 240 | | | | |
| 4 | 95 | bovine albumin | 70,000 | 47 | 100 |
| 5 | 513 | dextran | 40,000 | 277 | 41 |
| 5 | | ovalbumin | 45,000 | 279 | 100 |
| 6 | 557 | dextran | 40,000 | 204 | 57 |
| 7 | 727 | dextran | 40,000 | 128 | 39 |
| 7 | | ovalbumin | 45,000 | 131 | 95 |

EXAMPLE 2

Example 1 is repeated, changing the stretching ratio in the boiling water: the fibre is stretched to 1.5 times its original length.

The hollow fibre obtained has an internal diameter of 370 μ and an external diameter of 660 μ. The proportion

EXAMPLE 8

A collodion, prepared as in Example 1, is injected at the rate of 9.4 cm³/minute into the annular orifice of a spinneret similar to that of Example 1.

The spinneret is arranged along a vertical axis and its lower orifice end is immersed in an aqueous solution of NaCl of concentration 200 g/l at 8° C.

At the centre of the annular orifice of the spinneret, there is a second orifice of diameter 0.3 mm, through which an aqueous solution of NaCl of concentration 200 g/l, at 23° C, is injected at the rate of 1.16 cm³/minute into the core of the nascent hollow fibre.

The nascent hollow fibre travels through the coagulating bath over a length of 1 m at a speed of 12 m/minute.

At the outlet of this coagulating bath the hollow fibre passes for 30 cm through a bath of boiling water, the rate at which the fibre enters this bath being 12 m/minute and the rate at which it issues being 30 m/minute. The treatment of the fibre is completed by washing with pure water by sprinkling it for 1 minute over turns wound up on a roller.

The fibre thus obtained has an internal diameter of 350 μ and an external diameter of 500 μ. The proportion of empty space is 60%. There are no pores of diameter greater than or equal to 100 A.

From the fibre thus prepared, an enzymatic reactor is produced which possesses 300 fibres, each of 72 cm, arranged in parallel (72 cm represent the length available for ultrafiltration). This apparatus is used in an installation as described in FIG. 1.

1 liter of an aqueous solution of urea of concentration 5 g/l is made to flow inside the fibres at a flow rate of 10.5 l/hour. 0.5 l of an aqueous solution of urease of concentration 10 g/l is made to flow outside the fibres at a flow rate of 7.5 l/hour. The temperature of the solutions is 30° C.

In order to determine the rate of conversion of urea, the ammonium carbonate formed in the urea solution is measured periodically (using N/10 HCl; indicator: Methyl Orange). From the result of this measurement, the corresponding amount of urea which has been converted is calculated, without taking account of the ammonium carbonate present in the urease circuit in this calculation.

After 15 minutes, the urea is converted at the rate of 0.8 g/l. After 45 minute, the urea is converted at the rate of 1.85 g/l (by way of comparison, if the procedure followed had been simple mixing, the urea would have been converted respectively at the rate of 1.5 and 3.5 g/l).

Furthermore, no urease is observed in the circuit passing through the inside of the fibres.

We claim:

1. In a method of ultrafiltration or dialysis using a membrane, the improvement which comprises using as the membrane a skinless hollow fiber possessing a continuous longitudinally extending channel from macromolecular material, said fiber consisting essentially of a copolymer of acrylonitrile and an olefinically unsaturated comonomer containing an optionally salified sulfonic acid group, the proportion of optionally salified sulfonic acid groups in said copolymer being between 1 and 50% (by number) of the monomer units and possessing micropores of average diameter less than about 100 A, between 40 and 80% of walls of the fiber being empty space, said fiber possessing zero salt rejection, measured under a pressure of 2 bars for an aqueous solution containing 10 g/l of sodium chloride.

2. A method according to claim 1 in which the sulphonic acid comonomer has the formula: $CHR_1 = CR_3 — A — Y$ in which Y represents a $—SO_3H$ or $—SO_3M$ group, M being a metal atom, $R_1$ and $R_3$ independently represent a hydrogen atom or a methyl group, A represents a valency bond or a group of formula $—A'—$ or $—O—A'—$, in which $A'$ represents a straight or branched, saturated or unsaturated, divalent aliphatic hydrocarbon group, an unsubstituted aromatic nucleus or a monoaromatic-monoaliphatic chain in which one of the free valencies is carried by an aliphatic carbon atom and the other by an aromatic carbon atom.

3. A method according to claim 2 in which M represents an alkali metal.

4. A method according to claim 1 in which the sulphonic acid comonomer is selected from vinylsulphonic, allylsulphonic, methallylsulphonic, styrenesulphonic, vinyloxybenzenesulphonic, allyloxy- and methallyloxy-benzenesulphonic and allyloxy- and methallyloxy-ethylsulphonic acid and a salt thereof.

5. A hollow fibre according to claim 1 in which the proportion of sulphonic acid monomer units is between 5 and 15%.

6. A hollow fibre according to claim 1 in which the acrylonitrile copolymer has a specific viscosity (measured at 25° C. as a 2 g/l solution in dimethylformamide) of between about 0.1 and 3.

7. A method according to claim 1 in which the hollow fibre has an external diameter of between about 50 and 1,000 μ, and a wall thickness of between about 5 and 40% of the external diameter.

8. A method according to claim 7 in which the hollow fibre has an external diameter of between about 100 and 600 μ and a wall thickness between about 10 and 25% of the external diameter.

* * * * *